2,965,599

PROCESS FOR PLASTICIZING LINEAR POLYAMIDES WITH PENTADECYL PHENOLS AND SHAPED PRODUCT THEREFROM

Rudolf Gabler, Tamins, Graubunden, Switzerland, assignor to Inventa A.G. fuer Forschung und Patentverwertung, Zurich, Switzerland No Drawing. Filed Aug. 26, 1957, Ser. No. 680,435

Claims priority, application Switzerland Sept. 21, 1956

8 Claims. (Cl. 260—33.4)

The present invention relates to a process for the production of plasticized synthetic linear polyamides, which are used for making threads, foils, cable sheaths, ribbons, extruded articles, rods, pipes, hoses and other shaped articles. The process comprises mixing to polyamides as a softening or plasticizing agent phenols which are substituted in meta-position to a hydroxyl group by a straight-chain pentadecyl radical.

The polyamides are a class of synthetics which exhibits insufficient compatibility throughout with softening agents or plasticizers. Although the problem of plasticizing polyamides has been extensively investigated, up to the present it has not been possible to find plasticizers for homopolyamides which are satisfactory in every respect. (Hopff, Mueller, Wenger, "Die Polyamide," 1954, pp. 187–188.) Even in mixed polymers which have slightly better compatibility for plasticizers, only very thin planar articles, such as foils, could be plasticized in a satisfactory manner, whereas the plasticizing of compact articles has, up to the present, not been very successful.

Among the many substances suggested as plasticizers for polyamides we may mention, e.g. phenols, alcohols, amides of carboxylic and sulfonic acids, esters of phenols, of alcohols, hydroxy acids, halogen compounds, and many more. For industrial purposes only a small number of these compounds has found a limited use.

Of the phenols, only the easily accessible ortho- and para substitution products were tested for their softening action on polyamides up to the present. For instance, the p-isododecyl phenol has been used for a while for plasticizing mixed polyamide foils. Meta-substitution products have not as yet been used as plasticizers.

It has now been found that a known natural product, cardanol, which is recovered from the shells of the fruits of the West-Indian cashew nut tree (*Anacardium occidentale*), contains a number of substituted phenols which exhibit a surprisingly high plasticizing effect on polyamides, even homopolyamides, and are well compatible therewith. The hydrogenation product of cardanol, the so-called hydrocardanol, consists of about 90% of 3-n-pentadecylphenol and of about 10% of 5-n-pentadecyl resorcinol. The two components can be separated by distillation but they may be used very successfully for plasticizing in the original mixture.

Both phenols of hydrocardanol have only low volatility and are insoluble in water as well as in aqueous alkalies and acids, so that these plasticizers are not taken out from the polyamide when storage in water occurs, or upon laundering or dyeing. Even upon prolonged storage no exudation of the two plasticizers has been observed.

For incorporating the plasticizers into the polyamide the known methods can be used. For instance, the phenols may be mixed in a kneader or a worm conveyor with the polyamide to be plasticized. When polyamides, especially mixed polyamides with considerably lowered softening points, are used, the plasticizer can be rolled-in in a calender, the plasticized polyamide being then obtained as a soft sheet. In solid, preferably granular or pulverulent polyamides, the plasticizers according to the invention cn be absorbed from their solution in alcohols, hydrocarbons or other suitable solvents, in the manner of a dyeing process.

Finally, the polyamide can be dissolved together with the phenol, in a common solvent, such as formic acid, m-cresol or methanol, in the latter case at raised temperature, and may then be precipitated by a non-solvent, e.g. water. In this case, the plasticized polyamide is obtained as a powder. The solution of polyamide and plasticizer may also be cast into foils.

The most convenient method is the admixture of plasticizer to the monomeric polyamide-forming starting material, since both the 3-n-pentadecylphenol and the 5-n-pentadecylresorcinol can be heated without damage to the usual condensation temperatures of 220–280° C. Both phenols are of unlimited solubility in the molten monomer or in the monomer liquified with some water.

The concentration of the two phenolic plasticizers, or of their mixture is between about 3% and 30% and lies preferably at 15–25%, calculated on the polyamide. Below 3% there is no noticeable plasticizing action; and above 30% the strength of the product is so unfavorably affected, that it would be useless for most purposes.

Among the polyamides which can be plasticized effectively and permanently by 3-n-pentadecylphenol and/or 5-n-pentadecyl resorcinol, we name the following: polymers of caprolactam, oenantolactam, caprylic lactam, etc. and the corresponding amino acids; of ω-amino undecylic acid, furthermore of adipic acid hexa- and decamethylene diamine, sebacic acid hexamethylene diamine, and diamino dicyclohexylmethane, etc.

Apart from these homo polyamides, mixed condensates of two, three or more polyamide-forming starting materials can be plasticized with the above-named phenols. Furthermore, especially high-melting mixed polyamides from caprolactam and hexamethylene diammonium terephthalate, and similar polyamides, are very useful for the process according to the invention.

Plasticized polyamides made according to the invention may be processed so as to yield a large number of valuable products, which are distinguished by their high elasticity and suppleness. We mention, among others, yarns and wires for fishing lines and nets, belts for driving pulleys, plaited and knitted articles, hoses and pipes, cable sheaths, foils for wrappings, coatings for papers and textiles, for rainwear, table mats, etc. In all these cases the suppleness of conventional polyamides made without plasticizer was not satisfactory. The processing of the plasticized polyamides made according to the invention is done mostly by spinning of the melt, extrusion process, injection molding, application by spray gun, calendering, pressing, or similar shaping processes.

The invention will now be more fully described in a number of examples, but it should be understood that these are given by way of illustration and not of limitation and that many changes in the details can be made without departing from the spirit of the invention.

The parts are given by weight.

*Example 1*

In a heated vessel 90 parts of ε-caprolactam are melted together with 7 parts of water at 70–80° C. and subsequently a mixture is dissolved therein of 9 parts 3-n-pentadecylphenol and 5-n-pentadecylresorcinol. The homogeneous mixture is transferred into an autoclave heated to 250° C. and rinsed with nitrogen. After an internal excess pressure of 18 atms. is reached, the steam pressure is released and the melt is treated without pressure for 6 more hours at 250° C. to final polymerization.

By means of a pump disposed below the autoclave the molten mass is pressed through a nozzle so as to form a 1.2 mm. wire, which is solidified in a water bath. It is then drawn to 4 times the original length. A very supple monofilar thread is obtained, having a tearing strength of 65 kgs./mm.$^2$.

*Example 2*

A polyamide melt is made from: hexamethylene diammonium adipate in an autoclave provided with a stirrer, by condensing for 10 hours at 280° C. in the absence of oxygen. To 100 parts of this melt, 30 parts of molten 3-n-pentadecylphenol are added through a valve in the lid of the autoclave, and stirring in continued until a homogeneous distribution has been accomplished. The contents of the autoclave are then pressed off in the form of a ribbon or belt which is solidified by cooling, and granulated. The granulated mass can easily be extruded in normal extrusion apparatus and yields very resilient and supple articles. Extruded cylinders exhibit in compression tests a flow limit lower by 50% than the corresponding polyamide made without plasticizer.

*Example 3*

A worm extruder is filled with a mixture consisting of 92 parts granulated poly-ω-amino undecylic acid and 8 parts of powdered 3-n-pentadecylresorcinol which had been shaken in a tumbler. The mass is pressed at a cylinder temperature of 220–240° C. through a nozzle having an annular slot of 12 cm. diameter and 0.4 mm. width of slot; the hose which forms is blown up by nitrogen to a diameter of about 25 cm., is pulled toward the top and reeled. A very supple foil of 0.05 mm. thickness is obtained, showing the strength of 210 kg./cm.$^2$ at 350–400% elongation.

*Example 4*

In a vessel provided with a stirrer and a heating device, 29 kgs. of the granulated mixed polyamide from 70% sebacic acid hexamethylene diamine and 30% caprolactam are stirred with the solution of 3 kgs. 5-n-pentadecylresorcinol in 30 liters methanol for 5 hours at 50° C. After having filtered off the methanol solution, 30 kgs. of shreds or chips are obtained which contain after drying 3% 5-n-pentadecylresorcinol as plasticizer.

This material is fed into a worm extruder which is provided with a vertical spray head for making a cable sheath. Through the head, a cable is drawn consisting of a copper core and an insulating layer of polyethylene of 0.25 mm. thickness; as it emerges from the head, it is coated by an 0.18 mm. layer of the plasticized mixed polyamide, the drawing speed being 135 meters per min. The coated cable is supple, withstands wear by rubbing, and is resistant to cold temperatures down to minus 40° C.

*Example 5*

Into a stirring autoclave made of rust-proof steel and having a capacity of 100 liters, 2 kgs. 5-n-pentadecyl resorcinol dissolved in 30 liters methanol are fed, to which are added 6 kgs. poly-ε-caprolactam in the form of waste yarn; the whole is dissolved in a nitrogen atmosphere at 180° C. and 35 atm. excess pressure. After 3 hours, the mass is cooled down to 150° C. and for further cooling 30 liters water are pressed in slowly against the prevailing internal pressure, while stirring.

After cooling to room temperature, the polyamide containing 22% plasticizer separates in powder form and can be filtered off. After drying and screening of coarse particles, the mass may be extruded with a spray gun forming resilient tough coatings on metallic supports, the coatings being resistant against rubbing off.

*Example 6*

In an autoclave, 10 kgs. of a mixed polyamide obtained by polymerization of 68% hexamethylene diammonium adipate and 32% caprolactam in the form of shreds, is heated to 200° C. in 40 liters ethanol together with 1.7 kg. hydrocardanol in a nitrogen atmosphere. After 4 hours, cooling to 90° C. is effected. A viscous solution is thereby obtained, which is exceedingly well suited for producing supple, tough cast foils.

*Example 7*

At the upper end of a vertical tube of rust-proof steel maintained at 280° C., 140 kgs. molten hexamethylene diammonium terephthalate, 60 kgs. molten caprolactam, and 15 kgs. hydrocardanol are continuously added per hour. The melt is stirred by a vigorous nitrogen current while oxygen is excluded. The melt is kept in the tube at atmospheric pressure for 12 hours. At the lower end of the tube, polymer is continuously drained and pumped into an intermediate vessel. From the melt of the polymer, wires of a diameter of 1.5 mm. are continuously pressed through conventional nozzles, are quenched in water, and solidified. After elongation by 350%, such wires have a strength of 60 kgs./mm.$^2$. They are supple and can be joined by knots.

By shaped products of polyamides it is intended to include threads, foils, cable sheaths, ribbons, extruded articles, rods, pipes, hoses and similar shaped articles.

What I claim is:

1. A process for the production of plasticized synthetic linear polyamides, selected from the group consisting of polycaprolactam, polyoenantholactam, polycaprylic lactam, the polymers of ω-amino undecylic acid, adipic acid hexamethylene diamine, adipic acid decamethylene diamine, sebacic acid hexamethylene diamine, diamino dicyclohexylmethane, and mixtures thereof, which comprises admixing to said polyamides as plasticizer 3–10 percent of not more than two phenols having a single benzene ring and containing not more than two hydroxyl groups, said phenols being substituted solely, in meta-position to a hydroxyl group, by a straight chain pentadecyl radical.

2. Shaped products from synthetic linear polyamides, selected from the group consisting of polycaprolactam, polyoenantholactam, polycaprylic lactam, the polymers of ω-amino undecylic acid, adipic acid hexamethylene diamine, adipic acid decamethylene diamine, sebacic acid hexamethylene diamine, diamino dicyclohexylmethane, and mixtures thereof, and which are plasticized with 3–30 percent of not more than two phenols having a single benzene ring and containing not more than two hydroxyl groups, said phenols being substituted solely, in meta-position to a hydroxyl group, by a straight-chain pentadecyl radical.

3. The process according to claim 1, wherein the plasticizer is added to the polyamides after polymerization.

4. The process according to claim 1, wherein the plasticizer is added to the polyamide-forming monomers before polymerization.

5. The process according to claim 1, wherein the plasticizer is a mixture consisting of about 90% 3-n-pentadecyl phenol and about 10% 5-n-pentadecyl resorcinol.

6. The process according to claim 1, wherein the plasticizer is 3-n-pentadecyl phenol.

7. The process according to claim 1, wherein the plasticizer is 5-n-pentadecyl resorcinol.

8. Process according to claim 1, wherein the phenols are added to the monomeric components of the polyamides in a solvent.

References Cited in the file of this patent

UNITED STATES PATENTS

| | | |
|---|---|---|
| 2,341,877 | Middleton et al. | Feb. 15, 1944 |
| 2,816,055 | Semegen et al. | Dec. 10, 1957 |

FOREIGN PATENTS

| | | |
|---|---|---|
| 461,237 | Great Britain | May 9, 1935 |